Oct. 25, 1966 D. B. HAAGENSEN 3,281,568

OVEN CONTROL SYSTEM

Filed Nov. 12, 1963 2 Sheets-Sheet 1

INVENTOR.
DUANE B. HAAGENSEN
BY Weingarten,
Orenbuch, &
Pendiscio
ATTORNEYS

Oct. 25, 1966 D. B. HAAGENSEN 3,281,568
OVEN CONTROL SYSTEM
Filed Nov. 12, 1963 2 Sheets-Sheet 2

INVENTOR.
DUANE B. HAAGENSEN
BY Weingarten,
Orenbuch, &
Pandiscio
ATTORNEYS

3,281,568
OVEN CONTROL SYSTEM
Duane B. Haagensen, Lincoln, Mass., assignor to Thermowave Corporation, New York, N.Y., a corporation of Delaware
Filed Nov. 12, 1963, Ser. No. 322,747
3 Claims. (Cl. 219—10.55)

This invention relates in general to ovens of the type employing electromagnetic wave energy for heating and more particularly pertains to apparatus for controlling the amount of energy applied to foods and other materials exposed to microwave energy in the oven.

When heating food in an oven, it is usually intended that the food be cooked until it reaches a state where the food is "done." In the conventional gas or electric oven, cooking of the food usually proceeds at a relatively slow rate so that a variation of five or ten minutes in cooking time does not appreciably alter the state of the food being cooked. In a microwave oven, however, the food is rapidly heated by direct exposure to microwave energy so that heating of the food by one or two seconds beyond the proper time may result in overcooking of the product.

In conventional gas and electric ovens, a temperature sensing device that is placed directly in the food is actuated almost entirely by the heat conveyed to it by conduction from the food and by convection from the heated air in the oven. Heating of the sensing device by radiation from the heating element of the oven is usually negligible. Many conventional gas and electric ovens have a temperature sensing device located in the oven in the vicinity where food is placed for heating. A sensing device so located is heated by convection from the air in the oven and is also heated by conduction from the metal rack by which it is supported. Because of the slow rate of heating of foods in the conventional gas or electric oven, the temperature of the air in the oven may be used in gauging the time required to cook the food.

In a microwave oven, heating is due to absorption of microwave energy incident upon the object in the oven. The amount of energy absorbed depends upon the characteristics of the material upon which the microwave energy impinges. Energy absorption characteristics vary widely for different materials. For example, a temperature sensing device may absorb more energy than the food, where both are directly exposed to the same microwave radiation period. Foods which are not of a homogeneous nature tend to be unevenly heated in a microwave oven because of the differing absorption characteristics of the food components.

The air in a microwave oven is not directly heated to any appreciable extent by absorption of energy from the radiation in the oven. As foods are quickly heated in a microwave oven, air convection cannot be relied upon to transfer heat from the food to a temperature sensing device located nearby even if that sensing device could be prevented from absorbing energy directly from the radiation in the oven.

To obtain correct heating, microwave ovens usually employ controls permitting selection of the level of microwave power and the length of time the power is applied. The knowledge for setting the controls properly is acquired, generally, after an extensive period of trial and error by the user of the microwave oven. Where the characteristics of the microwave energy source change, as by deterioration of the magnetron tube, or where the characteristics of the food change, as from one crop to another, the knowledge gained by experience, as to the proper settings of power and time must be modified. Attempts have been made to establish the amount of power required to cook a food by measuring certain of the food's characteristics, such as its weight and its electrical impedance. That technique of predetermining the amount of power is grossly inaccurate where the food is of an inhomogeneous nature or where the electrical impedance of the food changes as it is heated.

The present invention is directed to apparatus for automatically determining when food, or other substances, in a microwave oven have been heated to a desired temperature and thereupon actuating a mechanism which, for example, may cause microwave power to the oven to be shut off or reduced to a level where the food is kept warm.

Almost all foods are constituted in part by water. It has been observed that when heated, those foods give off vapors and if heated to a high enough temperature steam is given off. In addition to water vapor, most foods, when heated, release other vapors and gases. By ascertaining the temperature of the emitted vapors and gases, an indication of the temperature of the food in the oven is obtained.

Prior to this invention, microwave ovens have been constructed to convey vapors and gases, given off by a food in the oven's enclosure, to a temperature sensing element located in an exhaust duct where the sensing element was not exposed to microwave radiation. The temperature sensing element, in response to the temperature of the vapors and gases incident upon it, controlled the microwave power applied to the oven by shutting off the power when the food was "done" or by reducing the power to a level sufficient only to keep the food warm. By the time the vapors and gases reached the sensing element in the exhaust duct, the vapors and gases might have been only five to ten degrees centigrade above the ambient temperature. The sensing element, therefore, had to act on a temperature difference in the order of 10° C. The ambient temperature itself, however, can change by more than 10° as by heating of the air in the oven through conduction from the walls of the oven or simply by the normal diurnal variation in the weather. The sensing element in the earlier apparatus could not distinguish a rise in temperature due to gases and vapors given off by the heated food from a rise in the ambient temperature. It was necessary, because of the inability of the apparatus to distinguish the cause of the temperature rise, frequently to adjust the earlier apparatus to compensate for temperature changes not attributable to the vapors and gases given off by the heated food.

The principal object of the invention is to provide an improvement upon the earlier control apparatus to cause the improved apparatus to compensate automatically for temperature changes due to factors other than those caused by the vapors and gases from the heated food acting on the sensing element.

The invention, both as to its arrangement and manner of operation, can be better understood from a reading of the following exposition when considered in conjunction with the accompanying drawings in which.

Figure 1:
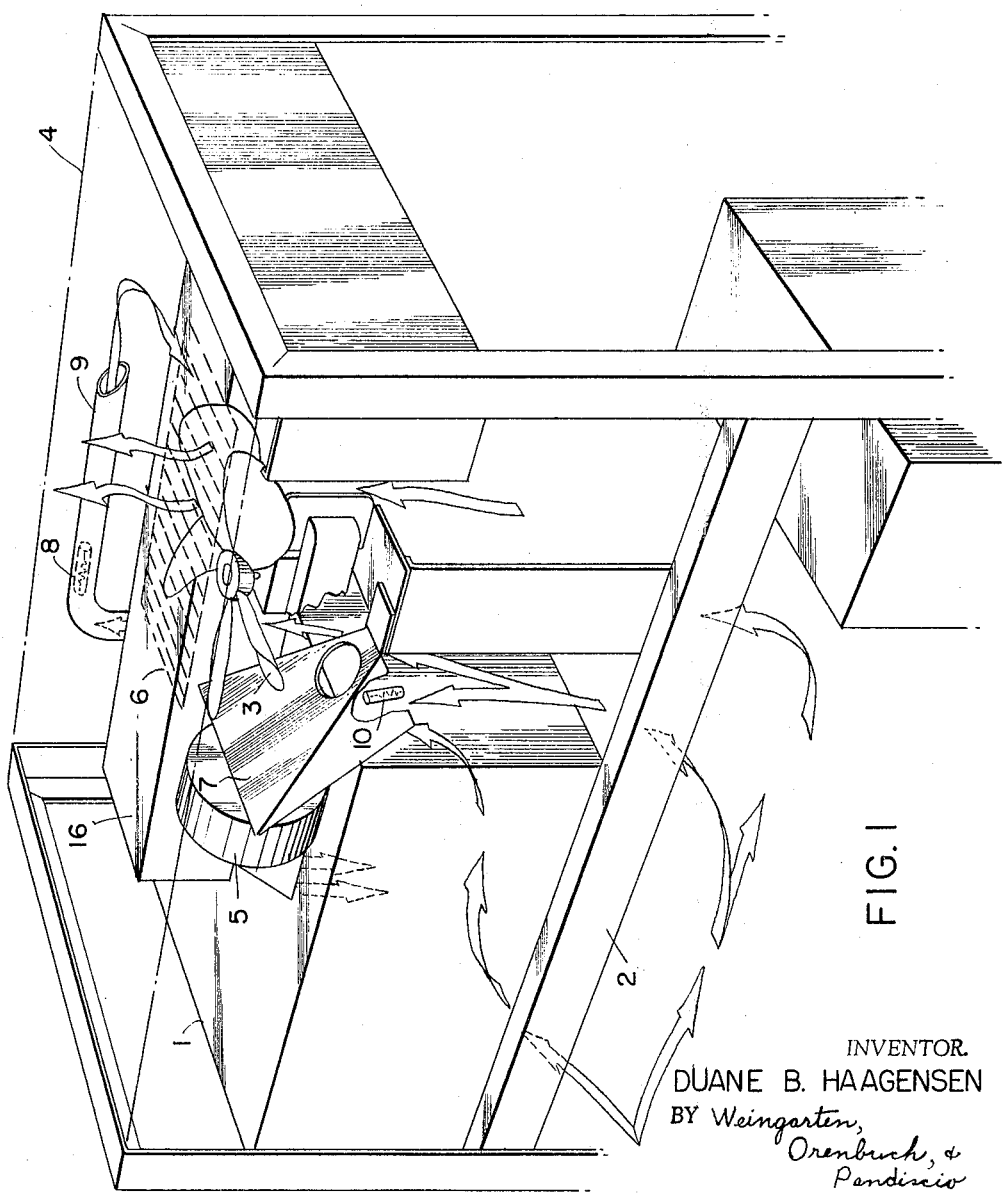
FIG. 1 depicts the flow paths of air in a microwave oven and the placement of the control elements in accordance with the invention.

FIG. 1 depicts a microwave oven 1 supported upon a frame 2. A cabinet 4 fits around the frame, the cabinet having openings at its front permitting air to be drawn in by an exhaust fan 3 mounted on the frame. Louvers 6 in the top of the cabinet permit the exhaust fan to vent the air to the exterior. The oven 1 has metallic walls which are cooled by the air circulating over them. A portion of the air stream drawn into the cabinet is channeled by a deflector plate 7 into the inlet of an air pump 5. The interior of the oven is ventilated by air forced down into the oven's cavity by the air pump. The air in the cavity exits through an exhaust duct 9 that vents the exhausted air to the fan 3. The flow of air through the oven, for an oven cavity of 1 cubic foot, is in the order of two or three cubic feet of air per minute. In the exhaust duct, a thermistor 8 is placed so that it is close to the oven and yet shielded from the microwave radiation in the oven. Microwave energy from a microwave generator such as a magnetron, is guided into the oven by a waveguide 16.

Adjacent deflector plate 7, an ambient temperature sensing thermistor 10 is disposed so that it, in effect, responds to the temperature of the air inducted by air pump 5. It is important to the invention that thermistor 10 shall not be affected by the air exhausted from the oven's cavity. The air exhausted from duct 9 is vented where the exhaust fan immediately pushes that air through the louvers to the exterior. Food in the oven, when heated by the microwave radiation, gives off vapors and gases which are carried in the air stream to the temperature sensing thermistor 8 in the exhaust duct and then are vented to the exterior. The volume of air flowing through the oven is kept to a minimum consistent with the requirement that the heated vapors be conveyed to the thermistor 8 with sufficient velocity so that the vapors have an appreciable effect upon the temperature of the thermistor. If the volume of air flow is too large, the heat of the vapors may be insufficient to raise the temperature of the thermistor appreciably above the temperature of the air in the stream. If the volume of air flow is too small, the vapors may not be carried quickly enough to the thermistor and may tend to collect in the oven's cavity.

Figure 2:
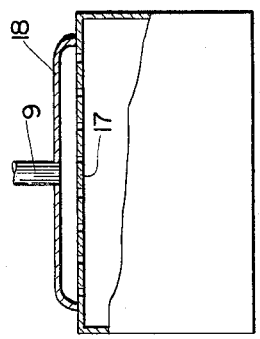
FIG. 2 is a view of the cavity of a microwave oven having a perforated plate in its upper wall.

As some foods do not heat evenly, it is possible for a portion of the food to give off vapors while other portions of the food are still relatively too cool to do so. Where all the vapors are immediately carried to thermistor 8, a false indication of the temperature may result. To prevent this, a plate having many small perforations can be attached to the upper wall of the oven. FIG. 2 shows the interior of microwave oven cavity with a perforated plate 17 forming part of the upper wall of the oven. The air and vapors passing through the perforations enter a header 18 and are exhausted through duct 9. The perforated plate acts as a shield to inhibit microwave energy in the oven from entering the exhaust duct and prevents thermal radiation given off by the food being heated from impinging directly upon the thermistor in the duct. In addition, the diameter of duct 9 is such that it appears to be a waveguide beyond cut-off to the oven's microwave energy. Preferably, the plate 17 is made of a material having a low specific heat to minimize condensation of the vapors and gases. The plate, because of the many small perforations through which the exhaust products must pass, in effect, prevents vapors that are localized in a small volume of the oven from unduly affecting thermistor 8. The rate at which localized vapors pass into the exhaust duct depends, of course, upon the number and fineness of the perforations in the plate.

Figure 3:
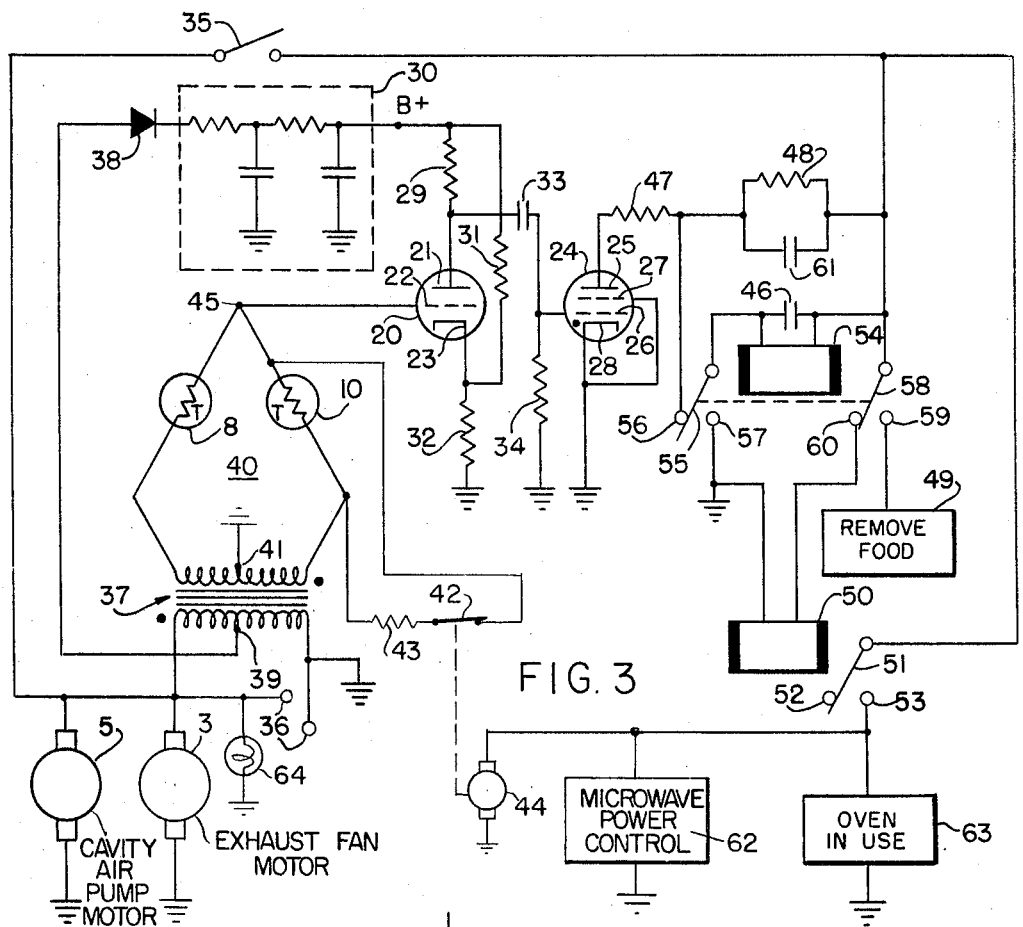
FIG. 3 is a schematic arrangement of the novel control mechanism.

FIG. 3 is a diagram showing the scheme of a preferred embodiment of the temperature sensing and control system. An amplifying tube 20 having an anode 21, a control grid 22, and a cathode 23 is connected so that it controls a thyratron 24 having an anode 25, a control grid 26, a suppressor grid 27, and a cathode 28. Anode 21 of tube 20 is connected by a load resistor 29, to a B+ source of D.C. voltage provided by a power supply having a filter 30. Resistors 31 and 32 are connected in series between B+ and ground to form a voltage divider. Cathode bias for amplifying tube 20 is obtained by connecting the cathode to the junction of resistors 31 and 32. The anode of tube 20 is coupled by a D.C. blocking capacitor 33 to control grid 26 of the thyratron and the control grid, in turn, is connected to ground by grid biasing resistor 34. The suppressor grid and cathode of the thyratron are grounded, and its anode 25 can be connected through a switch 35 to an A.C. source applied at terminals 36 of the primary winding of a transformer 37.

A.C. power applied to the system at terminals 36 is rectified by a diode 38, such as a selenium or silicon device, connected between a tap 39 on the primary winding of transformer 37 and filter 30. The filter, for purposes of exposition, is represented as being of the simple RC type employing a pair of capacitors and two resistors.

The secondary winding of transformer 37 forms two branches of a bridge 40 by having its center tap 41 grounded. A third branch of the bridge is formed by the vapor temperature sensing thermistor 8 and the fourth branch of the bridge has the ambient temperature sensing thermistor 10. Vapor temperature sensing thermistor 8 is located in the path of the air exhausted from the oven while ambient temperature sensing thermistor 10 is disposed in or adjacent the path of the air inducted into the oven, as previously described. Thermistor 10 is connected in parallel with a switch 42 and a resistor 43, the switch being controlled by a timing device, here represented as a motor 44. Control grid 22 of the amplifying tube is connected to the bridge 40 at junction 45.

The control system employs a relay 50 having an armature 51. In addition to relay 50, another relay 54 is employed having a pair of armatures 55 and 58. In their unenergized conditions, the positions of the relay armature are as shown in FIG. 2; that is, with no power applied to the relay windings, armature 51 is held against contact 52, armature 55 is held against contact 56 and armature 58 is held against contact 60. The winding of relay 50 is connected between contact 60 and contact 57 of relay 54. Contact 57 is grounded, whereas armature 58 is connected through switch 35 to input A.C. power terminal 36, so that when switch 35 is closed an energizing current flows into the winding of relay 50. Switch 35 is usually arranged so that it opens when the oven door is opened and is closed by shutting the door. Relay 50, upon being energized, causes armature 51 to be pulled against contact 53. Armature 51 is connected through switch 35 to terminal 36 and when the armature is pulled against contact 53 it applied A.C. power to the contact. Timing motor 44, microwave power control 62, and an OVEN IN USE sign 63 are actuated when A.C. power is applied to contact 53. Microwave power control 62 is a mechanism which turns the microwave power to the oven on and off, or which reduces the amount of microwave energy fed to the oven when armature 51 is against contact 52.

Relay 54 has one side of its winding connected to switch 35, the other side of its winding is connected to armature 55, and a capacitor 46 is connected across the winding. Contact 56 is connected by a current limiting resistor 47 to the anode 25 of the thyratron. A signal device 49 is connected between ground and contact 59 of relay 54; when energized, the signal device indicates the food has been cooked and may be removed from the oven. Preferably, the signal device is a lamp which illuminates a suitable legend, such as REMOVE FOOD.

When switch 35 is closed, A.C. power from terminal 36 is applied through resistors 47 and 48 to the anode of the thyratron. However, it should be noted that the thyratron can be "fired" only during the positive half cycle of the A.C. voltage. A capacitor 61 is connected in parallel with resistor 48.

To heat food in the microwave oven, a main switch (not shown) is closed, causing A.C. power to be applied to terminals 36. The motors of cavity air pump 5 and exhaust fan 3 are energized upon the closure of the main switch and a lamp 64 is lit, indicating the presence of A.C. power at the primary of transformer 37. Upon closing of the oven door, switch 35 is closed, applying A.C. power to the winding of relay 50 and the anode of the thyratron. Relay 50, upon being energized, causes armature 51 to be pulled against contact 53. The closure of armature 51 upon contact 53 energizes timer motor 44. At the same time, microwave power control 62 causes microwave energy to be fed into the oven and the OVEN IN USE sign is illuminated to indicate that food is being heated.

At the start of the heating cycle, switch 42 is closed so that ambient temperature thermistor 10 is shunted by switch 42 and resistor 43. The switch 42 remains closed for a length of time sufficient to permit all the air in the oven's cavity to be replaced by air introduced by the air pump. During the time switch 42 is closed, amplifier 20 is disabled from supplying a firing signal to thyratron 24. Resistor 43 prevents an unduly large current from flowing during the disabling period. The purpose of the disabling interval is to permit the oven's cavity to be cleared of any vapors and gases that may be present from an immediately prior heating of food and to permit both thermistor 8 and thermistor 10 to be brought to the same temperature by the ambient air stream flowing past them. At the end of the disabling period, timer motor 44 causes switch 42 to open, permitting ambient temperature sensing thermistor 10 to exert its control upon bridge 40. During the initial part of the heating cycle, therefore, both thermistor 8 and thermistor 10 are at or are quickly brought to the same temperature by the air flowing past them and any variation in the resistance of thermistor 8 caused by the ambient temperature is compensated by an off setting change in the resistance of the thermistor 10. Changes in the ambient temperature thus have negligible effect upon the balance or unbalance of bridge 40.

Assuming for purposes of exposition that bridge 40 is initially in balance, junction 45 holds grid 22 of the amplifying tube at ground potential. The cathode bias on the amplifying tube is such that the tube is in conduction. As the food is heated in the oven, the vapors and gases given off are carried to vapor temperature sensing thermistor 8 in the exhaust duct. The vapors and gases heat thermistor 8, causing the thermistor's resistance to drop. The drop in the resistance of the thermistor 8 unbalances bridge 40, causing a positive signal to be impressed on the control grid of the amplifying tube during every other half cycle of the A.C. voltage and a negative signal to be impressed on the control grid on alternate half cycles. The amplified signal at the anode 21 is passed through the D.C. blocking capacitor 33 to the grid 26 of the thyratron. The windings of transformer 37 are arranged in accordance with the convention indicated by the dots adjacent the end of the windings. As the dotted ends of the windings have the same polarity, it is evident that when a negative signal is on the grid of the amplifying tube, a positive voltage is at the anode of the thyratron and the thyratron, therefore, is in condition to be fired. The thyratron conducts when the signals on its grid reaches the "firing" potential.

The resistance of vapor temperature sensing thermistor 8 drops, at the time the food is done, to a value that unbalances the bridge to the extent required to cause the thyratron to fire. That value is directly dependent upon the resistance of ambient temperature sensing thermistor 10 and upon the amplification factor in the amplifier stage.

The current flow through the thyratron, when it fires, charges capacitors 61 and 46. When the voltage across the capacitors reaches a value sufficient to cause relay 54 to become energized, armatures 55 and 58 are pulled toward contacts 57 and 59. During the time armature 55 moves from contact 56 to contact 57, capacitor 46 provides the current to keep the relay energized. With armature 55 drawn against contact 57, relay 47 remains energized as contact 57 is grounded. The movement of armature 58 from contact 60 to contact 59 causes the REMOVE FOOD indicator 49 to be illuminated and cuts off the current to the winding of relay 50. Thereupon, armature 51 is pulled away from contact 53, causing microwave power control 62 either to reduce the microwave power to the oven to keep the food warm or to entirely shut off the microwave power to the oven. Simultaneously, the OVEN IN USE sign is extinguished and timer motor 44 is de-energized, causing switch 42 to close.

Upon opening the oven door to remove the food, switch 35 is opened, causing relay 54 to become de-energized so that the control system is made ready for the next use of the oven. During the first use of the oven, it will have become somewhat heated. At the next use of the oven, the inlet air drawn in by the fan of the exhaust motor and the cavity air pump circulates around the walls of the oven and becomes heated. The heated air, in the first moments of oven operation, brings the thermistors 8 and 10 to the same temperature and thereby establishes an initial condition for the bridge 40. The initial condition of the bridge is the same whatever the ambient temperature may be as any change in resistance of thermistor 8 due to the ambient is compensated by an offsetting change in the resistance of thermistor 10. The vapors and gases given off by the heated food act only upon thermistor 8 and are exhausted from the cabinet without affecting ambient temperature thermistor 10.

Figures 4, 5:
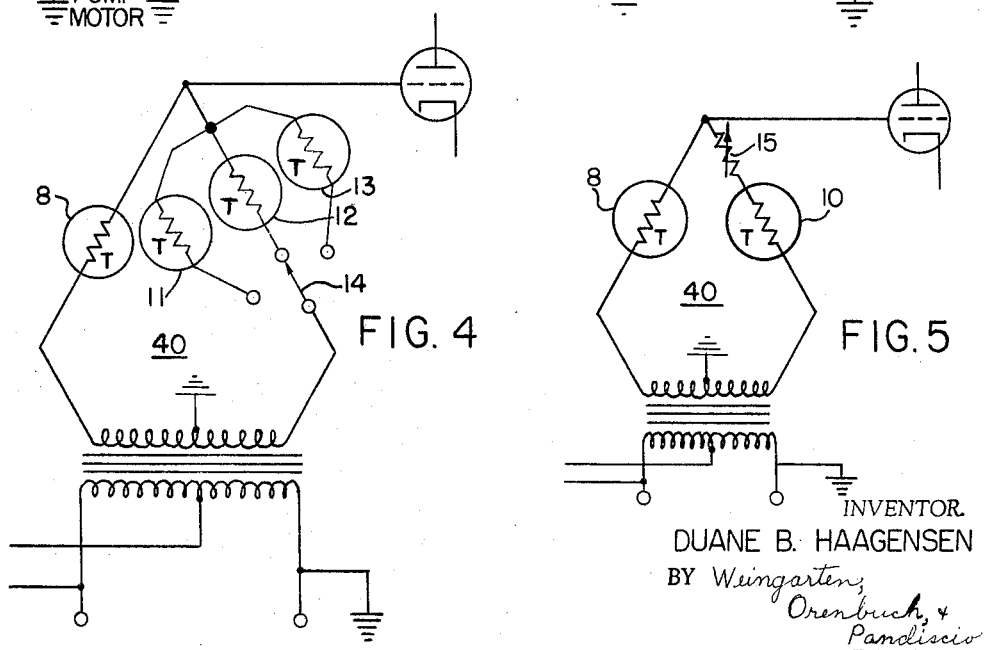
FIG. 4 depicts a preferred form of the bridge controlling the amplifying tube.
FIG. 5 depicts an alternative form of the bridge controlling the amplifying tube.

As different types of food require different heating periods, the bridge 40, in actual practice, may have a number of ambient temperature sensing thermistors, as indicated in FIG. 4, with a switch 14 arranged to select a desired one of those thermistors. The thermistors 11, 12, and 13 have different values of resistance and consequently, the length of the heating period depends upon which of the thermistors is chosen.

An alternative bridge construction, which is not as precise in control as the arrangement of FIG. 4, is depicted in FIG. 5. One ambient temperature sensing thermistor 10 is employed in the FIG. 5 arrangement together with a variable resistor 15. By setting the variable resistor at different values, the heating period can be varied. However, as the variable resistor is not temperature dependent, its setting disturbs the compensating effect of ambient temperature sensing thermistor 10.

While a preferred embodiment has been described, it is evident that modifications can be made that do not depart from the essential inventive concept. For example, the invention has been described as employing thermistors. It is well known that thermistors are devices having a negative temperature coefficient of resistance; that is, the resistance of a thermistor decreases with an increase in temperature. Bolometers are temperature sensitive devices having a positive temperature coefficient of resistance so that the resistance of a bolometer increases with an increase in temperature. It is an obvious substitution to employ bolometers in the invention in place of thermistors and to adjust the bridge so that operation of the control system accomplishes the same end. It is intended, therefore, that the invention not be limited to the precise structures delineated herein, but rather that the scope of the invention be construed in accordance with the appended claims.

What is claimed is:

1. In heating apparatus of the type having an oven enclosure for confining microwave energy, a source of microwave energy, and means for coupling energy from the source to the oven enclosure, the improvement comprising:

means for causing an inducted stream of air to flow through the oven enclosure, whereby the stream carries along with it vapors and gases given off by heated objects in the oven enclosure;

an exhaust duct for venting exteriorly of the oven enclosure the air stream and the gases and vapors carried along in the stream;
a first sensing device responsive to the initial temperature of the inducted air stream;
a second sensing device disposed in the exhaust duct, the second sensing device being responsive to the temperature of the exiting vapors and gases;
a bridge having the first and second sensing devices in its arms;
and means controlled by the bridge for regulating the application of microwave energy to the oven enclosure.

2. In heating apparatus of the type having an oven enclosure for confiing microwave energy, a source of microwave energy, and means for coupling energy from the source to the oven enclosure, the improvement comprising:
means for causing air to be induced into and flow through the oven enclosure, whereby vapors and gases given off by a heated substance in the oven enclosure are carried along in the flowing air;
a first temperature responsive device disposed where it is not affected by microwave energy radiating from the oven and where it senses the temperature of the inducted air;
an exhaust duct for venting exteriorly of the oven enclosure air, gases and vapors exiting from the oven enclosure;
a second temperature responsive device disposed in the exhaust duct;
a perforated plate disposed so that the air, gases and vapors pass through the perforations before entering the exhaust duct;
and means controlled by the first and second temperature responsive devices for governing the application of microwave energy to the oven enclosure.

3. In heating apparatus of the type having an oven enclosure for confining microwave energy, a source of microwave energy, and means for coupling energy from the source to the oven enclosure, the improvement comprising:
means for causing air to be inducted into and flow through the oven enclosure, whereby vapors and gases given off by a heated substance in the oven are carried along in the flowing air;
a first temperature responsive device disposed where it is not affected by microwave energy radiating from the oven and where it senses the temperature of the inducted air;
an exhaust duct for venting exteriorly of the oven enclosure air, gases, and vapors exiting from the oven enclosure;
a second temperature responsive device disposed in the exhaust duct where it is not affected by microwave energy radiating from the oven;
an electrical resistance bridge having the first and second temperature sensing devices in its arms, the sensing devices being of the type whose resistance varies with temperature;
and means responsive to a predetermined condition of the bridge for controlling the application of microwave power to the oven enclosure.

References Cited by the Examiner

UNITED STATES PATENTS

| | | | |
|---|---|---|---|
| 2,595,748 | 5/1952 | Andrews | 219—10.55 |
| 2,689,932 | 9/1954 | Hornfeck | 236—23 |
| 3,022,987 | 2/1962 | Thorsheim | 263—33 |
| 3,096,971 | 7/1963 | Sidaris | 263—33 |
| 3,185,809 | 5/1965 | Bohm et al. | 219—10.55 |

ANTHONY BARTIS, *Acting Primary Examiner.*

RICHARD M. WOOD, *Examiner.*

L. H. BENDER, *Assistant Examiner.*